US010181932B2

United States Patent
Zhang et al.

(10) Patent No.: US 10,181,932 B2
(45) Date of Patent: Jan. 15, 2019

(54) METHOD TO COORDINATE RESOURCE ALLOCATION TO ADDRESS INTER-CELL INTERFERENCE

(71) Applicant: AVAGO TECHNOLOGIES INTERNATIONAL SALES PTE. LIMITED, Singapore (SG)

(72) Inventors: Lili Zhang, Beijing (CN); Haiming Wang, Beijing (CN); Wei Hong, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 25 days.

(21) Appl. No.: 15/479,571

(22) Filed: Apr. 5, 2017

(65) Prior Publication Data

US 2017/0222772 A1    Aug. 3, 2017

Related U.S. Application Data

(63) Continuation of application No. 14/432,173, filed as application No. PCT/CN2012/082178 on Sep. 27, 2012.

(51) Int. Cl.

| H04L 5/00 | (2006.01) |
|---|---|
| H04W 16/32 | (2009.01) |
| H04W 24/02 | (2009.01) |
| H04W 72/08 | (2009.01) |

(Continued)

(52) U.S. Cl.
CPC .......... *H04L 5/0032* (2013.01); *H04L 5/0058* (2013.01); *H04L 5/0073* (2013.01); *H04L 5/0096* (2013.01); *H04W 16/32* (2013.01); *H04W 24/02* (2013.01); *H04W 72/082* (2013.01); *H04W 72/1226* (2013.01); *H04W 72/1289* (2013.01); *H04W 84/045* (2013.01)

(58) Field of Classification Search
CPC .................................................... H04W 72/082
See application file for complete search history.

(56) References Cited

U.S. PATENT DOCUMENTS

| 8,611,295 B2 | 12/2013 | Song |
| 9,344,255 B2 | 5/2016 | Son |
| 9,960,892 B2 * | 5/2018 | Yamazaki ............. H04W 48/02 |

(Continued)

FOREIGN PATENT DOCUMENTS

| CN | 101951610 A | 1/2011 |
| CN | 102457912 A | 5/2012 |

(Continued)

OTHER PUBLICATIONS

International Search Report dated Jun. 27, 2013 in PCT/CN2012/082178.

*Primary Examiner* — Benjamin Lamont
(74) *Attorney, Agent, or Firm* — Xsensus, LLP

(57) ABSTRACT

A method to coordinate ABS resource allocation to address inter-cell interference comprises sending a first message by a first eNB to a second eNB, the first message specifying an interference level and a target cell identifier of a target eNB; receiving, by the target eNB, a second message sent by the second eNB, the second message specifying a resource allocation and a target cell identifier of the target eNB; and the target eNB operating according to the resource allocation specified in the second message.

20 Claims, 6 Drawing Sheets

(51) Int. Cl.
*H04W 72/12* (2009.01)
*H04W 84/04* (2009.01)

(56) References Cited

U.S. PATENT DOCUMENTS

| | | |
|---|---|---|
| 2011/0009141 A1 | 1/2011 | Harada et al. |
| 2011/0249642 A1 | 10/2011 | Song |
| 2012/0087266 A1 | 4/2012 | Vajapeyam |
| 2012/0106476 A1 | 5/2012 | Song |
| 2012/0113844 A1 | 5/2012 | Krishnamurthy |
| 2012/0113850 A1 | 5/2012 | Fu |
| 2012/0149362 A1 | 6/2012 | Tooher et al. |
| 2012/0155362 A1 | 6/2012 | Montojo |
| 2012/0157082 A1 | 6/2012 | Pedersen |
| 2013/0028199 A1 | 1/2013 | Song |
| 2013/0044704 A1 | 2/2013 | Pang |
| 2013/0059616 A1 | 3/2013 | Harada et al. |
| 2013/0084865 A1 | 4/2013 | Agrawal |
| 2013/0107798 A1 | 5/2013 | Gao |
| 2013/0182630 A1 | 7/2013 | Yamamoto |
| 2013/0258895 A1 | 10/2013 | Kim |
| 2013/0279419 A1 | 10/2013 | Li |
| 2013/0288696 A1 | 10/2013 | Nanri |
| 2014/0187263 A1 | 7/2014 | Geng |
| 2015/0050940 A1* | 2/2015 | Cai .......... H04W 72/082 455/452.2 |
| 2015/0124733 A1* | 5/2015 | Lim .......... H04W 52/244 370/329 |
| 2015/0207596 A1 | 7/2015 | Kroener |
| 2015/0223135 A1 | 8/2015 | Ratasuk |
| 2015/0223239 A1 | 8/2015 | Lee |

FOREIGN PATENT DOCUMENTS

| | | |
|---|---|---|
| JP | 2012-90122 A | 5/2012 |
| WO | WO 2011/159988 A1 | 12/2011 |
| WO | WO 2012077974 A2 | 6/2012 |
| WO | WO 2012108155 A1 | 8/2012 |

\* cited by examiner

METHOD TO COORDINATE RESOURCE ALLOCATION TO ADDRESS INTER-CELL INTERFERENCE

CROSS-REFERENCE TO RELATED APPLICATIONS

The present application is a continuation application which claims the benefit of priority under 35 U.S.C. § 120 of U.S. patent application Ser. No. 14/432,173, filed Mar. 27, 2015, which is a National Stage Entry based on PCT/CN2012/082178, filed Sep. 27, 2012, the entire contents of each of which are incorporated herein by reference.

FIELD

The present disclosure relates the field of wireless communications, and more particularly to a method to coordinate resource allocation to address inter-cell interference.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more of an Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA: includes Wideband-CDMA (W-CDMA) and Low Chip Rate (LCR) cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM. UMTS and LTE are described in documents from an organization named "3rd Generation Partnership Project" (3GPP).cdma2000 is described in documents from an organization named "3rd Generation Partnership Project 2" (3GPP2). These various radio technologies and standards are known in the art.

LTE (Long Term Evolution) is a new standard for wireless communication of high-speed data for mobile phones and data terminals. It is based on the GSM/EDGE and UMTS/HSPA (Universal Mobile Telecommunication System/High Speed Packet Access) network technologies, increasing the capacity and speed using new modulation techniques. The IP-based LTE network architecture, called the Evolved Packet Core (EPC) supports seamless handovers for both voice and data to cell towers with older network technology such as GSM, UMTS and CDMA2000. The LTE technology is adapted for a smooth evolution from earlier 3GPP systems. In LTE networking, technologies such as inter-cell interference coordination (ICIC) in the frequency domain and enhanced ICIC (eICIC) in the time domain have been developed for a new heterogeneous network topology in LTE-Advanced technology.

Heterogeneous networks arose due to the rapidly increasing numbers of mobile subscribers and demand for bandwidth, and the inadequacy of traditional macro base stations to meet subscriber requirements. Homogenous networks consisting of solely traditional macro base stations may have blind spots in coverage that adversely impact user experience. With the introduction of lower power base stations, including pico cells, femtocells, and relay nodes, LTE network topology becomes a heterogeneous network (HetNet) that is able to deliver more complete coverage. In a HetNet defined in 3GPP Release 10, low power nodes (LPNs), such as RRU/RRH, pico eNB (Enhanced Node B), home eNB, and relay node, are deployed inside the macro base station or enhanced node B coverage cell.

The concept of an Almost Blank Subframe (ABS) was introduced in eICIC to address control channel interference between a macro eNB and a smaller base station such as a pico eNB in the time domain. Almost blank subframes are transmitted at low power and only contain limited signals. The interfering base station is configured to include ABSs in its transmission so that the ABS may be used by the interfered cell to provide service for the User Equipment that previously experienced strong interference. By coordinating the transmissions of the macro eNB and the pico eNB using ABS, inter-cell interference is avoided.

SUMMARY

A method to coordinate resource allocation to address inter-cell interference comprises sending a first message by a first eNB to a second eNB, the first message specifying an interference level and a target cell identifier of a target eNB; receiving, by the target eNB, a second message sent by the second eNB, the second message specifying a resource allocation and a target cell identifier of the target eNB; and the target eNB operating according to the resource allocation specified in the second message.

A method to coordinate resource allocation to address inter-cell interference comprises sending, by a first eNB, a first LOAD INFORMATION message to a second eNB, the first message specifying an amount of Almost Blank Subframe resource needed; receiving, by the first eNB, a second LOAD INFORMATION message sent by the second eNB, the second message specifying an Almost Blank Subframe resource allocation; and the first eNB operating according to the Almost Blank Subframe resource allocation specified in the second LOAD INFORMATION message.

A method of coordinating allocated resources between a first and a second eNB having an overlapped coverage area comprises allocating a bandwidth resource; allocating a first set of the allocated bandwidth resource to the first eNB; allocating a second set of the allocated bandwidth resource to the second eNB, the second set of the allocated bandwidth and the first set of the allocated bandwidth having overlapped allocated resource and non-overlapped allocated resource; notifying the allocation to the first and second eNBs; and enabling the first eNB and second eNB to transmit data to user equipment in the overlapped coverage area using non-overlapped allocated resource.

DETAILED DESCRIPTION

Figure 1:
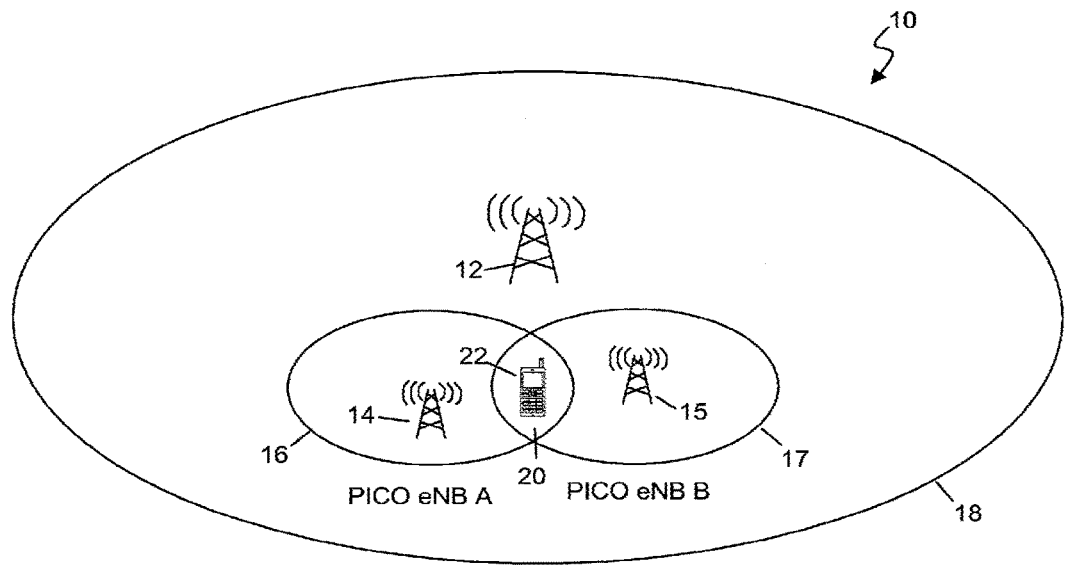
FIG. 1 is a simplified diagram of an exemplary heterogeneous network comprising a macro base station or enhanced node B (eNB) and two pico enhanced node B with overlapping cells.

FIG. 1 is a simplified diagram of an exemplary heterogeneous network 10 comprising a macro base station or Enhanced Node B (eNB) 12 and two pico Enhanced Node Bs, pico eNB A 14 and pico eNB B 15, with overlapping cells 16 and 17 within the macro cell 18. One or more mobile device or User Equipment 22 may operate in the overlap region 20 of the two pica cells 16 and 17. The User Equipment 22 may be serviced by pico eNB A 14, but it may experience significant interference from the other pico station, pico eNB B 15. This interference may be exacerbated especially if the association of the User Equipment 22 to pico eNB A 14 is due to Cell Range Expansion or CRE.

Figure 2:
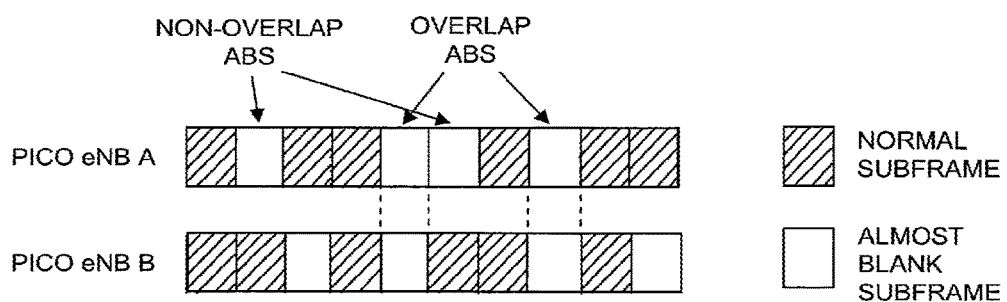
FIG. 2 is a simplified diagram of downlink subframes of the two overlapping pica cells according to the teachings of the present disclosure.

In order to operate multiple cells with overlapping coverage on a carrier frequency in the heterogeneous network 10, it may become necessary to have coordination between the cells so the transmissions from neighbouring network nodes do not interfere with one another. A time domain technique has been developed to coordinate interference between a macro cell and a lower power cell like a pico cell. Specifically, a cell can be configured with a pattern of Almost Blank Subframes (ABS) in which little or no transmission is scheduled. Generally in Almost Blank Subframes, only a very restricted set of data is transmitted. However, the 3GPP standard does not address the situation in which two low-power eNBs with overlapping cells are operating within a macro cell. FIG. 2 is a simplified diagram of exemplary downlink subframes of the two overlapping pico cells 16 and 17 according to the teachings of the present disclosure. More specifically, FIG. 2 may reference exemplary ABS patterns of the Physical Downlink Control Channel (PDCCH) of the two pico cells. It may be seen that in the allocated ABS patterns to the pico cells 16 and 17, there are overlapping ABS and non-overlapping ABS.

Figure 3:
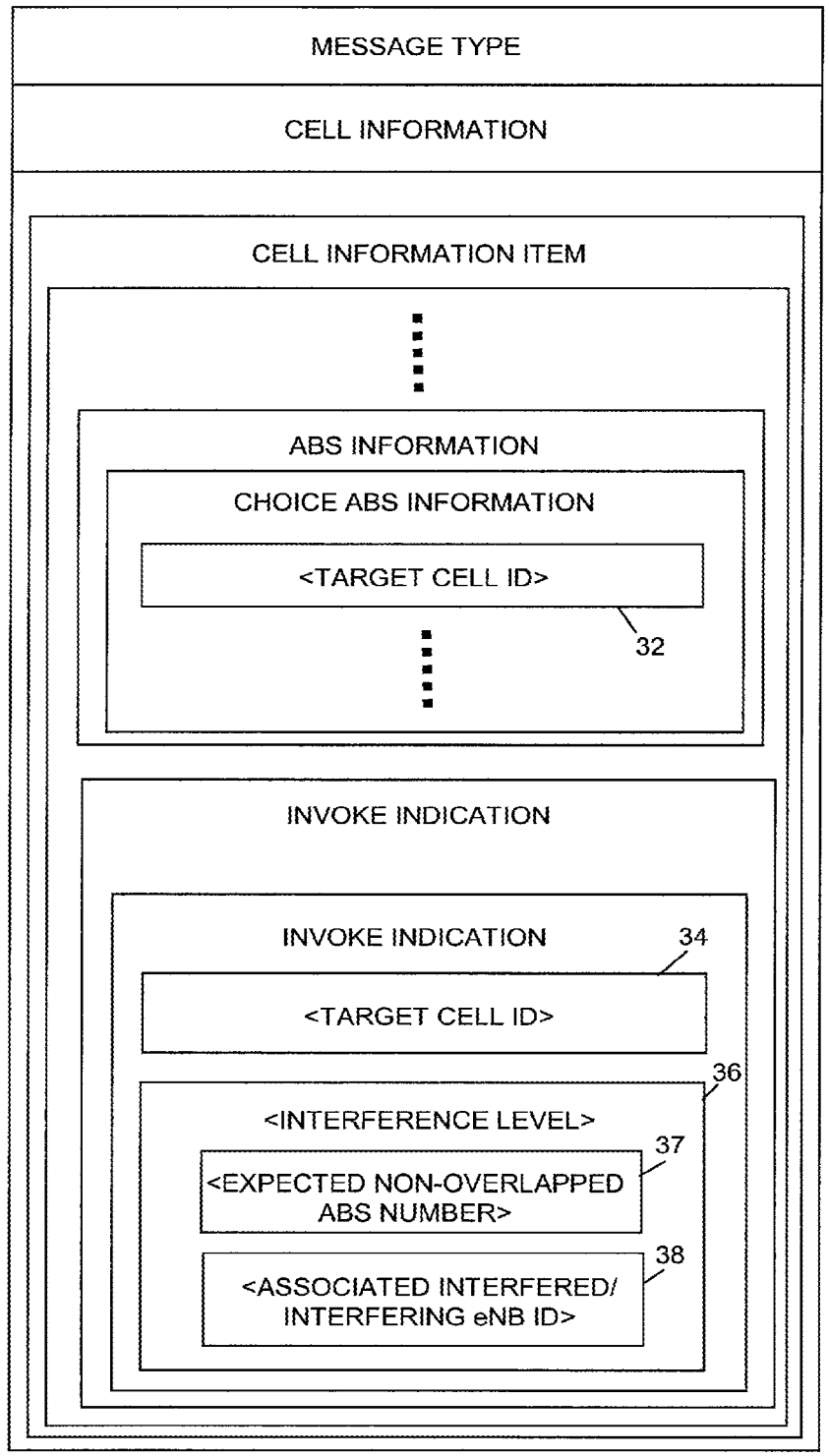
FIG. 3 is a simplified diagram showing the enhanced LOAD INFORMATION message structure of an exemplary embodiment according to the teachings of the present disclosure.

Referring to FIG. 3, which is a simplified diagram showing an exemplary enhanced LOAD INFORMATION message structure 30 that may be transmitted by an initiating pico eNB. The LOAD INFORMATION message 30 has been defined by 3*GPP Technical Specification Group Radio Access Network; Evolved Universal Terrestrial Radio Access Network (E-UTRAN); X2 Application Protocol (X2AP)* Release 11, TS 36.423 (2012 June). The existing LOAD INFORMATION message is used to initiate the Load Indication procedure for the purpose of transferring load and interference coordination information between eNBs controlling intra-frequency neighbouring cells. The present disclosure provides for the addition of certain new information elements or parameters to the existing LOAD INFORMATION message to enable overlapping pico cell ABS coordination. The enhanced LOAD INFORMATION message 30 includes an existing information element called ABS INFORMATION, which was designed to provide information about which subframes the sending eNB is configuring as Almost Blank Subframes and which subset of Almost Blank Subframes are recommended for configuring measurements towards the User Equipment. A further added information element to the ABS INFORMATION is the TARGET CELL ID information element 32 that is used to specify the identifier of the cell for which the ABS INFORMATION is meant. This TARGET CELL ID 32 would enable inter-pico cell coordination on the ABS usage.

The enhanced LOAD INFORMATION message 30 further includes an existing INVOKE INDICATION information element used to indicate which types of information the sending eNB would like the receiving eNB to send back. In the INVOKE INDICATION information element, new information elements are added: TARGET CELL ID information element 34, and INTERFERENCE LEVEL information element 36 which includes EXPECTED NON-OVERLAPPED ABS NUMBER 37 and ASSOCIATED INTERFERED/INTERFERING eNB ID 38. The TARGET CELL ID information element 34 contains the identifier of the cell for which the Invoke Indication request is meant. The EXPECTED NON-OVERLAPPED ABS NUMBER 37 contains the expected number of non-overlapped Almost Blank Subframes that should be allocated to adequately meet user demands. This parameter may be determined by taking into account of the bandwidth requirement in the overlapped area of the pico cells, such as the number of User Equipment, the traffic load, and the like. The ASSOCIATED INTERFERED/INTERFERING eNB ID 38 is used to specify the cell identifier of the eNB that is expected to respond to the Invoke Indication request, which may be the interfering pico eNB or the interfered pica eNB.

Figure 4:
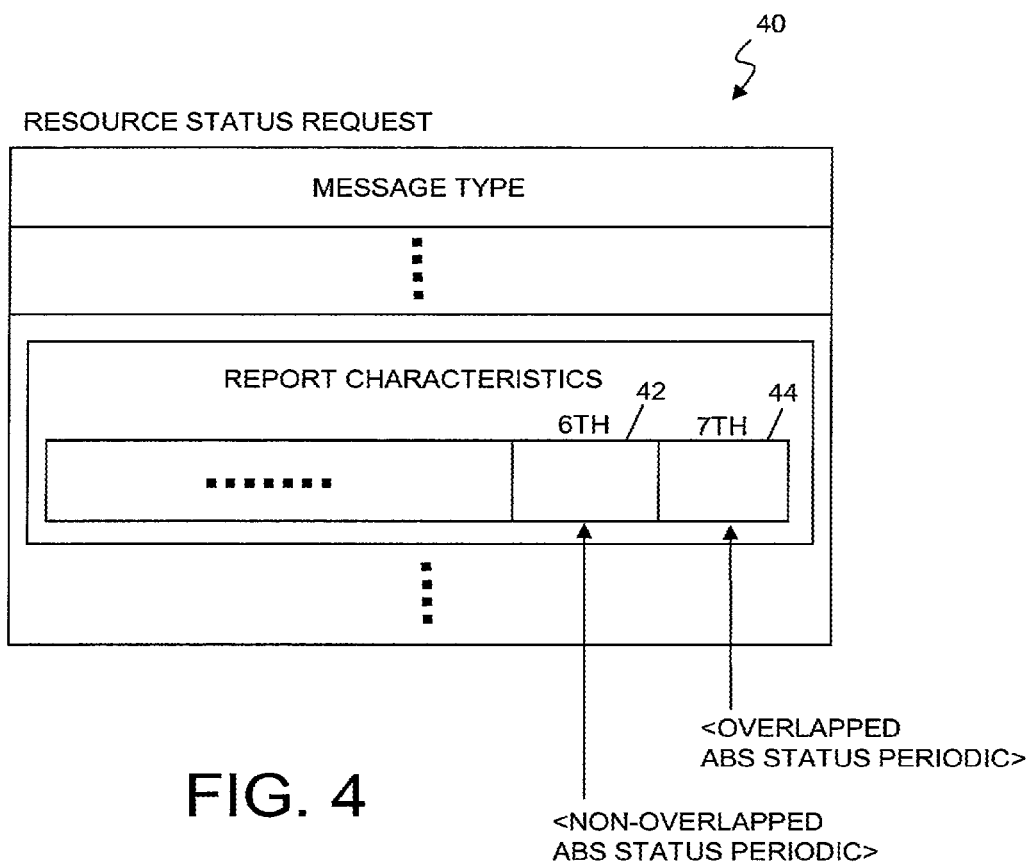
FIG. 4 is a simplified diagram showing the enhanced RESOURCE STATUS REQUEST message structure of an exemplary embodiment according to the teachings of the present disclosure.

3GPP Release 11 further provides for a Resource Status Reporting Initiation procedure that may be used by an eNB to request the reporting of load measurements to another eNB. This procedure is initiated with a RESOURCE STATUS REQUEST message sent from a first eNB to a second eNB. Upon receipt, the second eNB initiates the requested measurement according to the parameters specified in the request. FIG. 4 is a simplified diagram showing the RESOURCE STATUS REQUEST message structure 40 of an exemplary embodiment according to the teachings of the present disclosure. The enhanced RESOURCE STATUS REQUEST message 40 includes two new bits of data in the REPORT CHARACTERISTICS bitmap information element. More specifically, a 6th bit is now included to provide NON-OVERLAPPED ABS STATUS PERIODIC 44, and a 7th bit is now included to provide OVERLAPPED ABS STATUS PERIODIC 46. These two added bits in the bitmap indicate the overlap and non-overlap ABS status on which the second eNB is requested to report.

Figure 5:
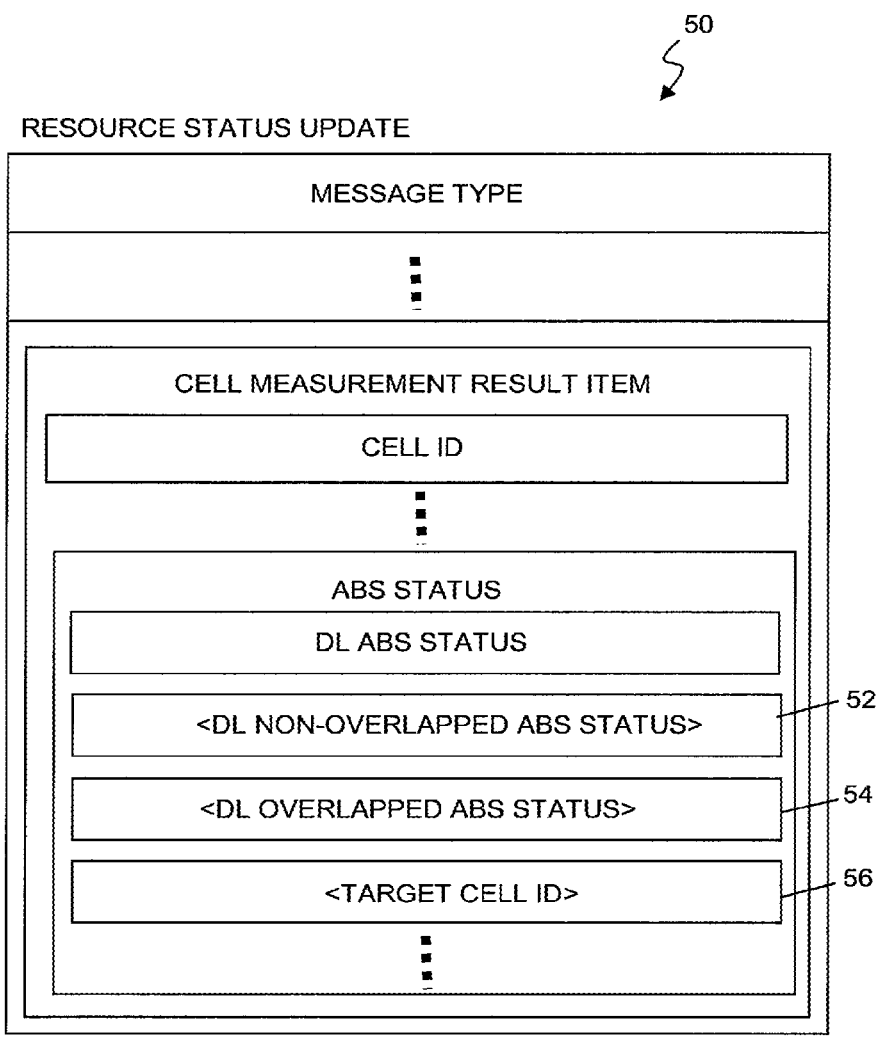
FIG. 5 is a simplified diagram showing the enhanced RESOURCE STATUS UPDATE message structure of an exemplary embodiment according to the teachings of the present disclosure.

FIG. 5 is a simplified diagram showing an enhanced RESOURCE STATUS UPDATE message structure 50 of an exemplary embodiment according to the teachings of the present disclosure. The RESOURCE STATUS UPDATE message 50 is sent by the eNB receiving the RESOURCE STATUS REQUEST message 40 to report the results of the requested measurements. Three new information elements or parameters are added to the existing RESOURCE STATUS UPDATE message: DL NON-OVERLAPPED ABS STATUS 52, DL OVERLAPPED ABS STATUS 54, and TARGET CELL ID 56. The new DL NON-OVERLAPPED ABS STATUS information element 52 is used to report the percentage of resource blocks of non-overlapped ABS allocated for User Equipment protected by non-overlapped ABS from inter-cell interference. The new DL OVERLAPPED ABS STATUS information element 54 is used to report the percentage of resource blocks of overlapped ABS allocated for User Equipment protected by overlapped ABS from inter-cell interference. The TARGET CELL ID 56 is used to indicate the identifier of the cell for which the downlink ABS status is meant. Therefore, the DL NON-OVERLAPPED ABS STATUS 52 and DL OVERLAPPED ABS STATUS 54 provide information about ABS resource utilization.

Figure 6:
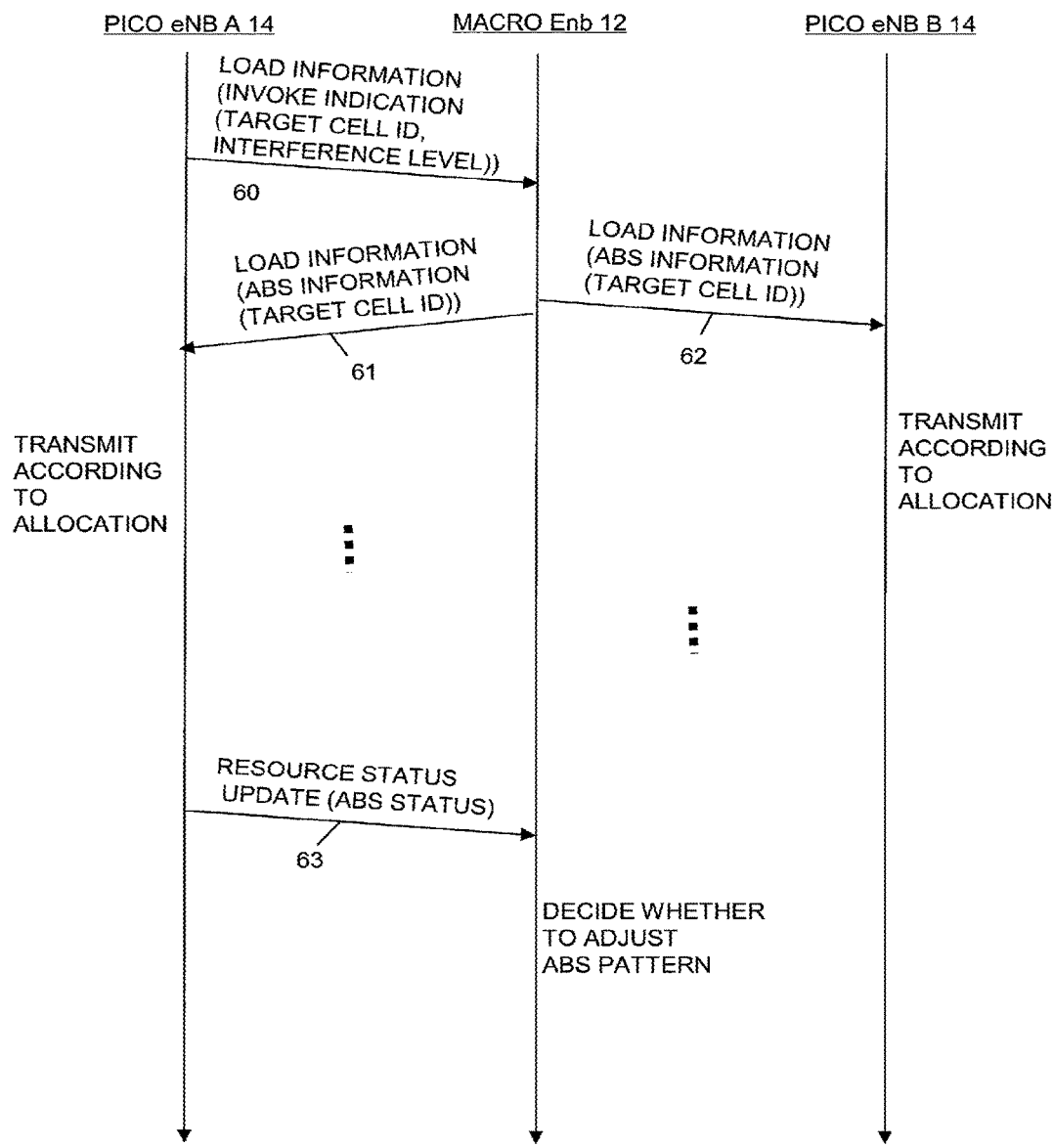
FIG. 6 is a simplified message flow diagram of an exemplary embodiment according to the teachings of the present disclosure.

FIG. 6 is a simplified message flow diagram of an exemplary embodiment according to the teachings of the present disclosure. In general in the first exemplary embodiment, an initiating pico eNB reports the INTERFERENCE LEVEL with respect to the overlapping one or more pico cells to the macro eNB, and the macro eNB determines the corresponding ABS pattern allocation and measurement for the overlapping pico cells. As shown in FIG. 6, the pico eNB A 14 initiates the Load Indication procedure by sending an enhanced LOAD INFORMATION message 60 to the macro eNB 12. The initiating pica eNB may be the interfering eNB or the interfered eNB. In other words, the initiating pica eNB may be the serving node that is experiencing interference from a neighbouring cell, or the eNB that is interfering with the transmissions of another eNB. The enhanced LOAD INFORMATION message 60 includes the enhanced INVOKE INDICATION information element that includes the added TARGET CELL ID information element 34 and INTERFERENCE LEVEL information element 36. Using the enhanced LOAD INFORMATION message 60, the macro eNB 12 is informed of the pica cells that experience interference, and the amount of protected resource that should be allocated to address the interference problem. In the example message flow shown in FIG. 6, the TARGET CELL ID information element 32 specifies the cell identifier of pica eNB B 15. In situations where more than two cells overlap and interfere with one another, the TARGET CELL ID information element 32 may include multiple cell identifiers.

Using the information reported by the initiating pico eNB A 14, the macro eNB 12 may decide on the protected ABS resource allocation and notify the ABS INFORMATION to the pica eNB B 15, as well as the initiating pica eNB A 14. The macro eNB 12 sends the LOAD INFORMATION messages 61 and 62 to the pico eNBs with overlapping cells, with the enhanced ABS INFORMATION element that specifies the TARGET CELL ID. The ABS INFORMATION element includes information on the ABS pattern, so that the targeted eNB is notified as to which subframes are designated as ABS. The overlapping pico cells are therefore operating with different ABS patterns that may have some overlapping Almost Blank Subframes, and some non-overlapping Almost Blank Subframes, as shown in FIG. 2. The number of non-overlapped Almost Blank Subframes allocated by the macro eNB 12 is determined in consideration of the interference level information reported by the initiating pica eNB A 14.

Accordingly, each pico eNB is operable to transmit to the User Equipment it serves in the overlapped coverage area using its respective non-overlapped ABS resource. For those User Equipment that are outside the overlapped coverage area, each pico eNB is operable to transmit using its respective overlapped ABS resource. Other pico cells not identified by the TARGET CELL ID are not affected and transmits normally. Further, the User Equipment operating inside the overlapped coverage area of the pico cells are configured by the respective pico eNB to use non-overlapped ABS resources for Channel State Information (CSI) measurement report. Likewise, the User Equipment operating outside of the overlapped coverage area of the pico cells are configured by the respective pica eNB to use overlapped ABS resources for Channel State Information (CSI) measurement report.

Continuing to refer to FIG. 6, a pico eNB may be triggered to report the non-overlapped ABS status and the overlapped ABS status by the occurrence of certain events. For example, a triggering event may be when the non-overlapped ABS STATUS or percentage of resource blocks of non-overlapped ABS allocated for User Equipment protected by non-overlapped ABS from inter-cell interference is higher than a predefined threshold. A triggering event may also be when the overlapped ABS STATUS or percentage of resource blocks of overlapped ABS allocated for User Equipment protected by overlapped ABS from inter-cell interference is higher than a predefined threshold. Other triggering events may be contemplated, such as the receipt of a RESOURCE STATUS REQUEST message that asks for the overlapped and non-overlapped ABS STATUS, for example. In response to a triggering event, the pico eNB A 14 sends a RESOURCE STATUS UPDATE message 63 to the macro eNB 12. The RESOURCE STATUS UPDATE message 63 provides information about ABS resource utilization in the added DL NON-OVERLAPPED ABS STATUS 52, DL OVERLAPPED ABS STATUS 54, and TARGET CELL ID 56 information elements, as described above.

In response to receiving the RESOURCE STATUS UPDATE message 63 from one or more pico cells, the macro eNB 12 may consider the data and decide whether to adjust the ABS allocation. For example, the macro eNB 12 may determine whether to adjust the ABS pattern in response to the non-overlapped and overlapped ABS STATUS. The macro eNB 12 may also determine the appropriate ratio of non-overlapped ABS resource to overlapped ABS resource in the ABS pattern.

Figure 7:
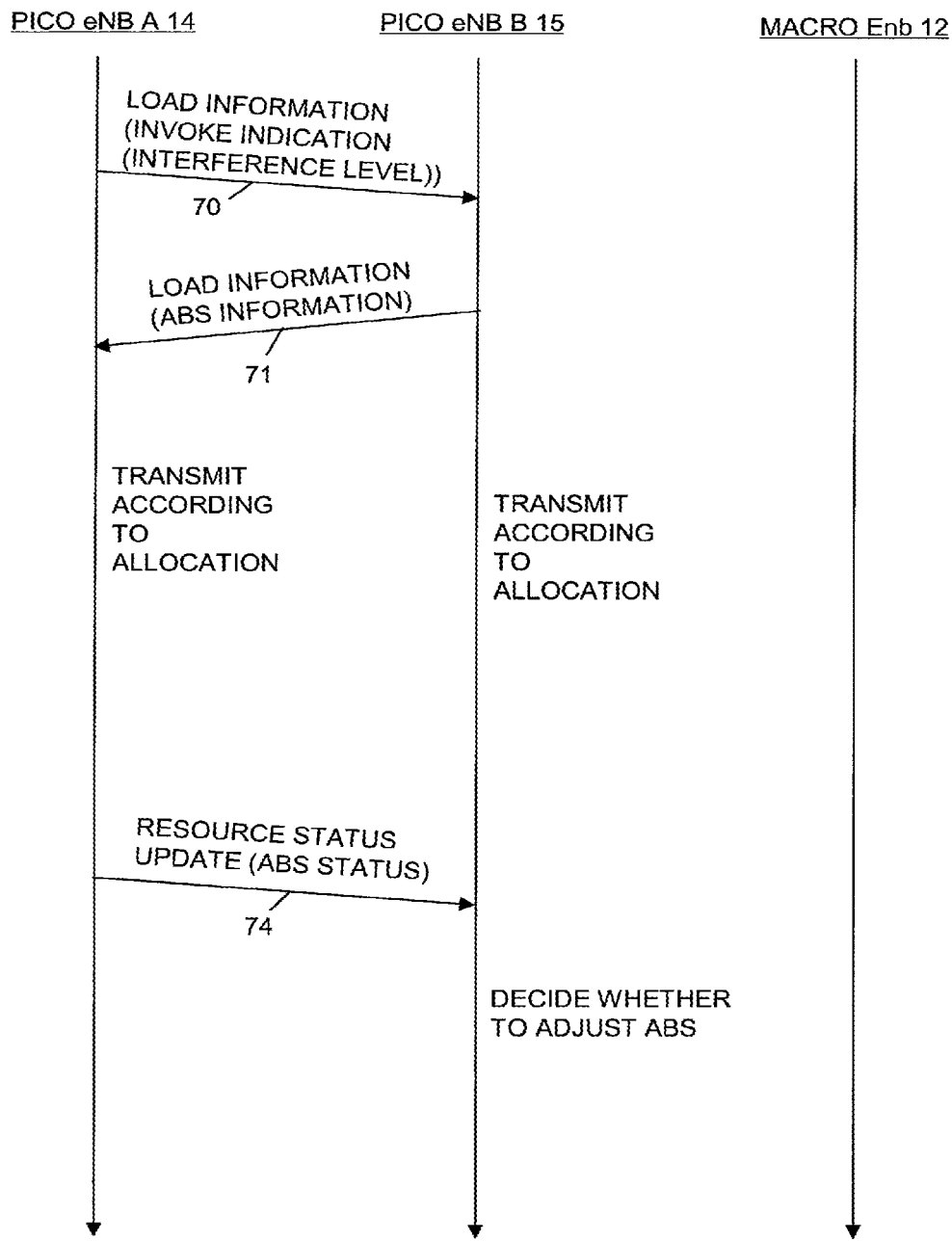
FIG. 7 is a simplified message flow diagram of another exemplary embodiment according to the teachings of the present disclosure.

FIG. 7 is a simplified message flow diagram of another exemplary embodiment according to the teachings of the present disclosure. In general in the second exemplary embodiment, an initiating pico eNB reports the interference level with respect to the overlapping one or more pico cells to the macro eNB, and the macro eNB determines the corresponding ABS pattern allocation and measurement for the overlapping pico cells. As shown in FIG. 7, the pico eNB A 14 initiates the Load Indication procedure by sending an enhanced LOAD INFORMATION message 70 to the macro eNB 12. The initiating pico eNB may be the interfered eNB in this instance. In other words, the initiating pico eNB may be the serving node that is experiencing interference from a neighbouring cell. The enhanced LOAD INFORMATION message 70 includes the enhanced INVOKE INDICATION information element that includes the added INTERFER- ENCE LEVEL information element 36. Using the enhanced LOAD INFORMATION message 70, the interfering pico eNB B 15 is informed of the interference in the overlap region, and the amount of protected resource that should be allocated.

Using the information reported by the initiating pica eNB A 14, the interfering pico eNB B 15 may decide on the protected ABS resource allocation and notify the ABS information to the pico eNB A 14. The pico eNB B 15 sends the LOAD INFORMATION message 71 to the pico eNB A with the enhanced ABS INFORMATION element. The ABS INFORMATION element includes information on the ABS pattern, so that the pico eNB A 14 is notified of which subframes are designated as ABS by the macro eNB 12, and the subset of that ABS allocation that may be used by the interfered pico eNB A 14. The overlapping pico cells may therefore operate using different ABSs that have been allocated by the macro eNB 12. The number of ABS allocated to the interfered pico eNB A 14 is determined in consideration of the interference level information reported by the interfered pico eNB A 14. It should be noted that it may be necessary to notify the macro eNB 12 to allocate further ABS resources due to the expected bandwidth demand in the overlapped region. The macro eNB 12 may also be kept informed of the ABS allocation that has been provided to the interfered pico eNB A 14.

Accordingly, each pico eNB is operable to transmit to the User Equipment it serves in the overlapped coverage area using its respective ABS resource. Accordingly, the pico eNBs 14 and 15 use different ABS allocated by the macro eNB when transmitting to User Equipment in the overlapping coverage area.

Continuing to refer to FIG. 7, a pico eNB may be triggered to report the overlapped ABS status by the occurrence of certain events. For example, a triggering event may be when the overlapped ABS STATUS or percentage of resource blocks of overlapped ABS allocated for User Equipment protected by overlapped ABS from inter-cell interference is higher than a predefined threshold. Other triggering events may be contemplated, such as the receipt of a RESOURCE STATUS REQUEST message that asks for the overlapped ABS STATUS, for example. In response to a triggering event, the pico eNB A 14 sends a RESOURCE STATUS UPDATE message 74 to the pico eNB B 15. The RESOURCE STATUS UPDATE message 74 provides information about ABS resource utilization in the added DL OVERLAPPED ABS STATUS 54 information element, as described above.

In response to receiving the RESOURCE STATUS UPDATE message 74 from one or more pico cells, the pico eNB B 15 may consider the data and decide whether to adjust the ABS allocation.

Further, the User Equipment served by the pico eNB A 14 operating inside the overlapped coverage area of the pico cells are configured by the pico eNB A 14 to use the ABS resources allocated by the macro eNB 12 and pico eNB B 15 for Channel State Information (CSI) measurement report. Likewise, the User Equipment served by the pico eNB A 14 operating outside of the overlapped coverage area of the pico cells are configured by the pico eNB A 14 to use ABS resources allocated by the macro eNB 12 minus the ABS resources allocated by pico eNB B 15 for Channel State Information (CSI) measurement report.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

GLOSSARY

3GPP Third Generation Partnership Project
ABS Almost Blank Subframe
CDMA Code Division Multiple Access
CS Circuit Switched
CSI Channel State Information
CRE Cell Range Expansion
DL Downlink
eICIC Enhanced Inter-Cell Interference Coordination
eNB Enhanced Node B
eNodeB Enhanced Node B
EPC Evolved Packet Core
E-UTRAN Evolved Universal Terrestrial Radio Access Network
FDMA Frequency Division Multiple Access
GSM Global System for Mobile Communications
HetNet Heterogeneous Network
HSPA High Speed Packet Access
LTE Long Term Evolution
PDCCH Physical Downlink Control Channel
TDMA Time Division Multiple Access
UE User Equipment
UMTS Universal Mobile Telecommunication System
UTRAN UMTS Terrestrial Radio Access Network
WCDMA Wideband Code Division Multiple Access

The invention claimed is:

1. A method to coordinate resource allocation to address inter-cell interference, comprising:
    sending a first message by a first pico eNB to a macro eNB, the first message specifying a target cell identifier of a second pico eNB and an expected number of Almost Blank Subframes (ABS) to service user equipment in an overlap region between the first pico eNB and the second pico eNB;
    receiving, by the second pico eNB, a second message sent by the macro eNB, the second message specifying an ABS resource allocation and the target cell identifier of the second pico eNB; and
    the second pico eNB operating according to the ABS resource allocation specified in the second message.

2. The method of claim 1, further comprising;
    receiving a third message by the first pico eNB sent by the macro eNB, the third message specifying an ABS resource allocation and a target cell identifier of the first pico eNB.

3. The method of claim 1, further comprising:
    monitoring allocated resource usage; and
    reporting, by the first pico eNB, the status of allocated resource to the macro eNB.

4. A macro base station comprising:
    a communication interface configured to
        receive, from a first pico base station, a first message specifying a target cell identifier of a second pico base station and an expected number of Almost Blank Subframes (ABS) to service user equipment in an overlap region between the first pico base station and the second pico base station; and
        transmit, to the second pico base station, a second message specifying an ABS resource allocation and a target cell identifier of the second pico base station, wherein the second pico base station operates according to the ABS resource allocation specified in the second message.

5. The macro base station of claim 4, wherein the macro base station is a macro Enhanced Node B (eNB), the first pico base station is a first pica eNB.

6. The macro base station of claim 5, wherein the communication interface is configured to transmit, to the first pica eNB, a third message specifying an ABS resource allocation and a target cell identifier of the first pico eNB.

7. The macro base station of claim 4, further comprising: circuitry configured to monitor allocated resource usage.

8. The macro base station of claim 4, wherein the communication interface is configured to receive, from the first pico base station, a status of resources allocated to the first pico base station.

9. The macro base station of claim 4, wherein the first message specifies an expected resource need as the interference level.

10. A system comprising:
a first pico base station configured to transmit, to a macro base station, a first message specifying a target cell identifier of a second pico base station and an expected number of Almost Blank Subframes (ABS) to service user equipment in an overlap region between the first pico base station and the second pico base station;
the macro base station configured to determine a first ABS resource allocation for the first pico base station and a second ABS resource allocation for the second pico base station based on the first message received from the first pico base station; transmit a second message to the first pico base station specifying a target cell identifier of the first pico base station and the first ABS resource allocation; and transmit a third message to the second pico base station specifying the target cell identifier of the second pico base station and the second ABS resource allocation, wherein the first pico base station is configured to operate according to the ABS resource allocation specified in the second message, and the second pica base station is configured to operate according to the ABS resource allocation specified in the third message.

11. The system of claim 10, wherein the first message is a LOAD INFORMATION message including the target cell identifier of the second pico base station, the expected number of Almost Blank Subframes (ABS) to service user equipment in an overlap region between the first pico base station and the second pico base station, and a current ABS configuration of the first pico base station.

12. The system of claim 10, wherein the first message includes an INVOKE INDICATION information element that includes a request for information from the macro base station.

13. The system of claim 10, wherein the first pico base station is configured to send, to the macro base station, a fourth message indicating a usage status of resources allocated to the first pico base station.

14. The system of claim 13, wherein the fourth message is a RESOURCE STATUS UPDATE message indicating a number of non-overlapped ABS and overlapped ABS determined by the first pico base station.

15. The system of claim 13, wherein the base station is configured to:
determine a change of resource allocation at the first pico base station based on the fourth message; and
transmit a fifth message to the first pico base station indicating a change in resource allocation for the first pico base station.

16. The system of claim 10, wherein the first pico base station is configured to determine whether a predetermined condition is satisfied that triggers transmission of the first message to the macro base station.

17. The system of claim 16, wherein the predetermined condition includes determining that a ratio of non-overlapped ABS is higher than a predetermined threshold value.

18. The system of claim 16, wherein the predetermined condition includes receiving, from the macro base station, a request for the number of overlapped ABS and non-overlapped ABS at the first pico base station.

19. The method of claim 1, further comprising:
determining, by the first pico eNB, whether a predetermined condition is satisfied that triggers transmission of the first message to the macro eNB.

20. The method of claim 19, wherein the predetermined condition includes at least one of determining that a ratio of non-overlapped ABS is higher than a predetermined threshold value.

* * * * *